US012692008B2

(12) United States Patent
Govindaraju et al.

(10) Patent No.: US 12,692,008 B2
(45) Date of Patent: Jul. 28, 2026

(54) EVACUATION INFLATABLE HAVING SELF-HEALING FABRIC

(71) Applicant: GOODRICH CORPORATION, Charlotte, NC (US)

(72) Inventors: Parthasarathy Govindaraju, Bangalore (IN); Harish Venkateshaiah, Bangalore (IN); Abhiram Pattabhiram, Bangalore (IN); Chana Kesava Reddy, Hyderabad (IN)

(73) Assignee: GOODRICH CORPORATION, Charlotte, NC (US)

( * ) Notice: Subject to any disclaimer, the term of this patent is extended or adjusted under 35 U.S.C. 154(b) by 1325 days.

(21) Appl. No.: 17/471,504

(22) Filed: Sep. 10, 2021

(65) Prior Publication Data

US 2022/0153422 A1 May 19, 2022

(30) Foreign Application Priority Data

Nov. 16, 2020 (IN) .............................. 202041049883

(51) Int. Cl.
| | |
|---|---|
| *B62D 25/14* | (2006.01) |
| *B64D 25/14* | (2006.01) |
| *D06N 3/00* | (2006.01) |
| *D06N 3/14* | (2006.01) |

(52) U.S. Cl.
CPC ........... *B64D 25/14* (2013.01); *D06N 3/0043* (2013.01); *D06N 3/0059* (2013.01); *D06N 3/0068* (2013.01); *D06N 3/14* (2013.01); *B32B 2307/762* (2013.01); *D10B 2505/12* (2013.01)

(58) Field of Classification Search
CPC ................................................ B32B 2307/762
See application file for complete search history.

(56) References Cited

U.S. PATENT DOCUMENTS

| | | | | | |
|---|---|---|---|---|---|
| 982,049 | A | * | 1/1911 | Gayner | .................. B29C 70/20 |
| | | | | | 442/73 |
| 4,282,052 | A | * | 8/1981 | Dobson | .................. B60C 19/12 |
| | | | | | 152/553 |
| 4,382,305 | A | * | 5/1983 | Hall | ..................... A47C 27/085 |
| | | | | | 5/665 |

(Continued)

FOREIGN PATENT DOCUMENTS

| | | |
|---|---|---|
| CN | 204249486 | 4/2015 |
| CN | 207274077 | 4/2018 |

(Continued)

OTHER PUBLICATIONS

1 European Patent Office; European Search Report dated Mar. 22, 2022 in Application 21207248.2.

(Continued)

*Primary Examiner* — Robert Canfield
(74) *Attorney, Agent, or Firm* — SNELL & WILMER L.L.P.

(57) ABSTRACT

A self-healing fabric for an inflatable of an evacuation system may comprise a fabric layer, an interior thermoplastic polymeric layer formed over a first side of the fabric layer, and an exterior thermoplastic polymeric layer formed over a second side of the fabric layer. The interior thermoplastic polymeric layer may include a first healing agent. The exterior thermoplastic polymeric layer may include a second healing agent.

20 Claims, 8 Drawing Sheets

(56) References Cited

U.S. PATENT DOCUMENTS

| | | | | |
|---|---|---|---|---|
| 4,538,311 | A * | 9/1985 | Hall | E04H 4/0025 |
| | | | | 4/584 |
| 7,612,152 | B2 | 11/2009 | Braun et al. | |
| 7,723,405 | B2 | 5/2010 | Braun et al. | |
| 7,963,075 | B2 * | 6/2011 | Howland | A62C 3/0257 |
| | | | | 160/40 |
| 8,822,024 | B2 | 9/2014 | Luchsinger et al. | |
| 9,415,575 | B2 * | 8/2016 | Beiermann | B32B 27/283 |
| 9,481,144 | B1 * | 11/2016 | Duggal | B64D 25/14 |
| 9,995,014 | B2 * | 6/2018 | Donovan | E02D 17/202 |
| 10,016,954 | B2 | 7/2018 | Donovan et al. | |
| 10,508,204 | B2 | 12/2019 | Odarczenko et al. | |
| 10,640,655 | B2 | 5/2020 | Kim et al. | |
| 2009/0035551 | A1 * | 2/2009 | Luchsinger | B32B 27/12 |
| | | | | 156/77 |
| 2011/0177736 | A1 | 7/2011 | Donovan et al. | |
| 2012/0321828 | A1 * | 12/2012 | Jolley | C08L 75/02 |
| | | | | 528/68 |
| 2018/0203163 | A1 | 7/2018 | Thakkar et al. | |
| 2018/0273796 | A1 | 9/2018 | Smith et al. | |
| 2025/0084202 | A1 * | 3/2025 | Liao | C08G 18/3215 |

FOREIGN PATENT DOCUMENTS

| | | | | | |
|---|---|---|---|---|---|
| CN | 108035167 | | 5/2018 | | |
| CN | 208633391 | | 3/2019 | | |
| CN | 108277657 | B * | 10/2019 | | D06M 14/00 |
| CN | 110734530 | | 1/2020 | | |
| EP | 2505719 | | 5/2016 | | |
| KR | 101780451 | | 9/2017 | | |
| WO | WO-2007009280 | A1 * | 1/2007 | | B29C 73/20 |
| WO | 2013083693 | | 6/2013 | | |
| WO | 2014120321 | | 8/2014 | | |
| WO | 2019083259 | | 5/2019 | | |

OTHER PUBLICATIONS

European Patent Office, European Office Action dated Mar. 24, 2023 in Application No. 21207248.2.

European Patent Office, European Office Action dated Jun. 24, 2025 in Application No. 21207248.2.

* cited by examiner

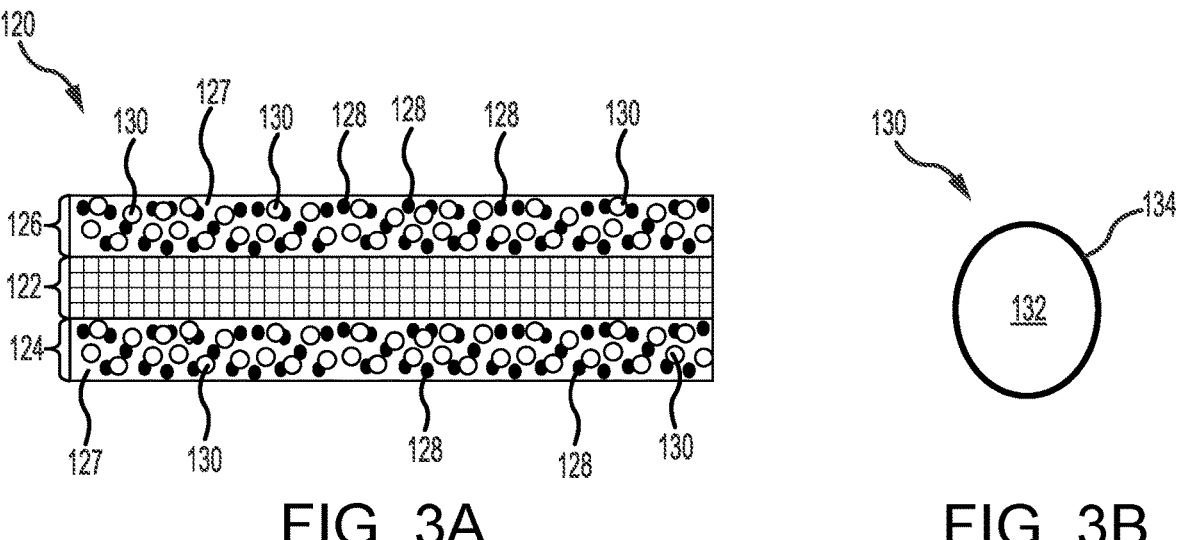
FIG. 3A
FIG. 3B
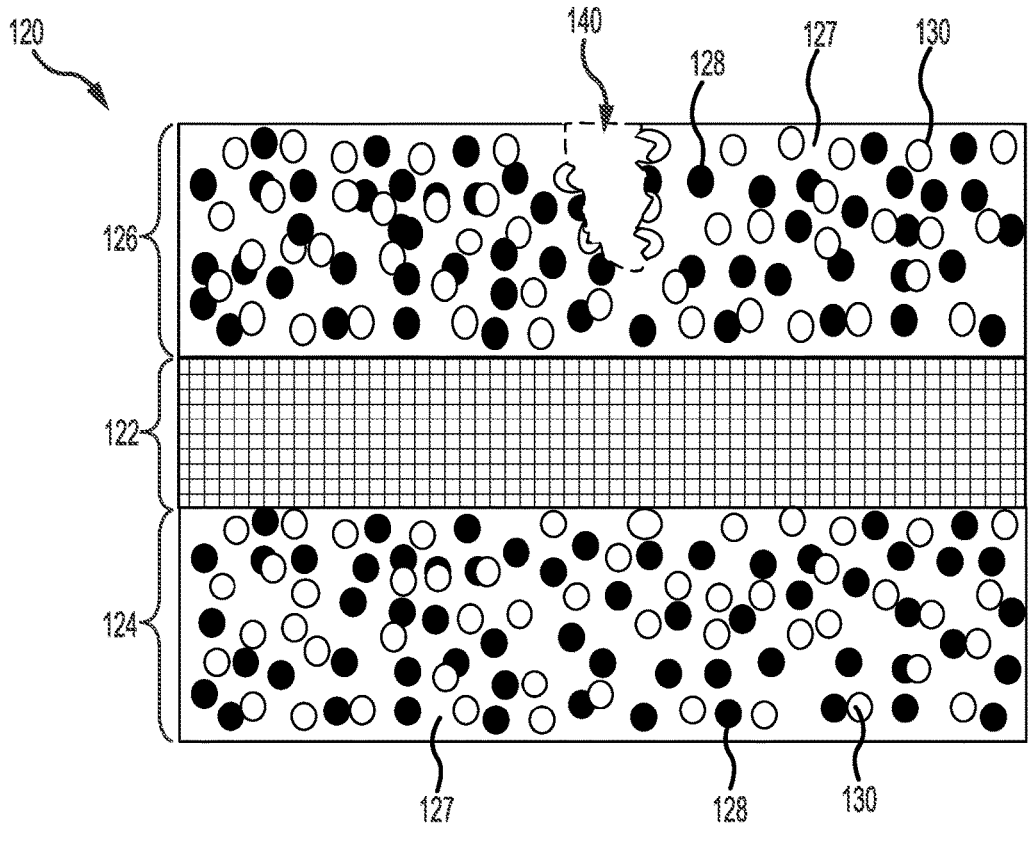
FIG. 4A

300

310

FORM 1ST THERMOPLASTIC POLYMERIC LAYER INCLUDING 1ST HEALING AGENT OVER 1ST SIDE OF FABRIC LAYER
310a

FORM 2ND THERMOPLASTIC POLYMERIC LAYER INCLUDING 2ND HEALING AGENT OVER 2ND SIDE OF FABRIC LAYER
310b

FORM INFLATABLE USING SELF-HEALING FABRIC
320

310a

FORM MIXTURE COMPRISING HEALING AGENT AND POLYURETHANE POLYMER
312

APPLY MIXTURE TO FABRIC LAYER
314

EVACUATION INFLATABLE HAVING SELF-HEALING FABRIC

CROSS-REFERENCE TO RELATED APPLICATIONS

This application claims priority to, and the benefit of, India Patent Application No. 202041049883, filed Nov. 16, 2020 and titled "EVACUATION INFLATABLE HAVING SELF-HEALING FABRIC," which is incorporated by reference herein in its entirety for all purposes.

FIELD

The present disclosure relates to aircraft evacuation systems and, in particular, to evacuation inflatables, such as evacuation slides and life rafts, having self-healing fabric.

BACKGROUND

Emergency evacuation systems may be used to exit an aircraft absent a jet way or other suitable means of egress for passengers. The evacuation systems generally include an inflatable such as an inflatable slide and/or an inflatable life raft. Current inflatables are generally formed of polymer coated fabrics. These polymer coated fabric typically include a composite material in which a woven base cloth is sandwiched between polyurethane polymer coatings. During the manufacturing and/or service life of the inflatable, the polymer coated fabric is subjected to stresses such as, tensile stress and shear stress, at various locations along the inflatable. The stresses can weaken the material integrity of the polymer coated fabric, resulting in defects such as porosity, pinholes, coating peel off, microcracks, etc. Defects in the inflatable's fabric can lead to functional test failures and field failures of the inflatable. Detection and/or repair of defects in current polymer coated fabrics tends to be labor intensive and time consuming. Further, the repairs can weaken the material properties of the polymer coated fabric.

SUMMARY

A self-healing fabric for an inflatable of an evacuation system is disclosed herein. In accordance with various embodiments, the self-healing fabric may comprise a fabric layer, an interior thermoplastic polymeric layer, and an exterior thermoplastic polymeric layer. The interior thermoplastic polymeric layer may be formed over a first side of the fabric layer. The exterior thermoplastic polymeric layer may be formed over a second side of the fabric layer, the second side being opposite the first side. The interior thermoplastic polymeric layer may include a first healing agent. The exterior thermoplastic polymeric layer may include a second healing agent.

In various embodiments, the first healing agent may be encapsulated within a shell comprised of at least one of urea formaldehyde, melamine formaldehyde, or polyurethane. In various embodiments, the first healing agent may be encapsulated within at least one of a hollow fiber member or a carbon nano tube.

In various embodiments, a vascular network may be formed over the first side of the fabric layer. The first healing agent may be located in the vascular network. In various embodiments, at least one of a plurality of encapsulated healing agents or a plurality of hollow fiber healing agents may be dispersed in the interior thermoplastic polymeric layer.

In various embodiments, the interior thermoplastic polymeric layer may comprise thermoplastic polyurethane. In various embodiments, the first healing agent may comprise a monomer of thermoplastic polyurethane. In various embodiments, the first healing agent may comprise a diisocyanate.

In various embodiments, the first healing agent may comprise a healing polymer. The healing polymer may include at least one of polycaprolactone, polylactic acid, polyester, or a blocked isocyanate and an autocatalytic polyol.

An inflatable for an evacuation system is also disclosed herein. In accordance with various embodiments, the inflatable may comprise a self-healing fabric defining an inflation chamber. The self-healing fabric may comprise a fabric layer, an interior thermoplastic polymeric layer formed over the fabric layer and oriented toward the inflation chamber, and an exterior thermoplastic polymeric layer formed over the fabric layer and oriented away from the inflation chamber. The interior thermoplastic polymeric layer may include a first healing agent. The exterior thermoplastic polymeric layer may include a second healing agent.

In various embodiments, the interior thermoplastic polymeric layer and the exterior thermoplastic polymeric layer may each comprise thermoplastic polyurethane. In various embodiments, the first healing agent may be encapsulated within a shell comprised of at least one of urea formaldehyde, melamine formaldehyde, or polyurethane. In various embodiments, the first healing agent may be encapsulated within at least one of a hollow fiber member or a carbon nano tube.

In various embodiments, the self-healing fabric may comprise a first vascular network formed over a first side of the fabric layer and a second vascular network formed over a second side of fabric layer. The first vascular network may include a plurality of first interconnected channels located in the interior thermoplastic polymeric layer. The first healing agent may be located in the plurality of first interconnected channels of the first vascular network. The second vascular network may include a plurality of second interconnected channels located in the exterior thermoplastic polymeric layer. The second healing agent may be located in the plurality of second interconnected channels of the second vascular network.

In various embodiments, the interior thermoplastic polymeric layer may define the plurality of first interconnected channels. In various embodiments, the first healing agent may comprise a healing polymer. The healing polymer may include at least one of polycaprolactone, polylactic acid, polyester, or a blocked isocyanate and an autocatalytic polyol.

A method of forming an inflatable for an evacuation system is also disclosed herein. In accordance with various embodiments, the method may comprise forming a self-heling fabric by forming a first thermoplastic polymeric layer including a first healing agent over a first side of a fabric layer and forming a second thermoplastic polymeric layer including a second healing agent over a second side of the fabric layer. The method may further comprise forming an inflatable chamber of the inflatable using the self-healing fabric.

In various embodiments, forming the first thermoplastic polymeric layer including the first healing agent over the first side of the fabric layer may comprise forming a mixture comprising the first healing agent and polyurethane polymer, and applying the mixture to the first side of the fabric layer. The first healing agent may comprise at least one of a monomer of polyurethane polymer or a healing polymer. The healing polymer may include at least one of polycaprolactone, polylactic acid, polyester, or a blocked isocyanate and an autocatalytic polyol.

In various embodiments, forming the first thermoplastic polymeric layer including the first healing agent over the first side of the fabric layer may further comprise forming the first healing agent. In various embodiments, forming the first healing agent may comprise dispersing the monomer of polyurethane polymer in an aqueous solution containing at least one of urea formaldehyde, melamine formaldehyde, or polyurethane; and heating and stirring the aqueous solution to polymerize the at least one of urea formaldehyde, melamine formaldehyde, or polyurethane and encapsulate the monomer of polyurethane polymer within the at least one of urea formaldehyde, melamine formaldehyde, or polyurethane. In various embodiments, forming the first healing agent may comprise forming at least one of a hollow fiber member or a carbon nano tube; and filling, at least partially, the at least one of the hollow fiber member or the carbon nano tube with the monomer of polyurethane polymer.

In various embodiments, forming the first thermoplastic polymeric layer including the first healing agent over the first side of the fabric layer may comprise forming a vascular network over the first side of the fabric layer; filling, at least partially, the vascular network with the first healing agent; and applying a thermoplastic polymeric material including a catalyst over the first vascular network.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3A illustrates a cross-section view of a self-healing fabric of an evacuation system inflatable, with the self-healing fabric including microencapsulated healing agent, in accordance with various embodiments;

FIG. 3B illustrates a microencapsulated healing agent of the self-healing fabric of FIG. 3A, in accordance with various embodiments;

FIGS. 4A and 4B illustrate a cross-section view of a damaged self-healing fabric and a repaired self-healing fabric, respectively, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity. As used herein, "proximate" refers to a direction towards or a location closer to a reference component.

Evacuation systems of the present disclosure include an inflatable (e.g., an inflatable slide or a life raft) formed of self-healing fabric. The self-healing fabric comprises thermoplastic polyurethane coatings bonded to opposing sides of a woven fabric. In various embodiments, nano sized capsules and/or hollow fibers and/or a vascular network containing a healing agent are dispersed in the polyurethane coating. In response to damage to the polyurethane coating, the healing agent is released. The self-healing (i.e., repair) of the damage occurs via polymerization of the released healing agent at the damaged zone. In various embodiments, the self-healing fabric is configured for non-autonomous self-healing, wherein polymerization of the healing agent occurs in response to an external stimulus. In various embodiments, a dye may be included with the healing agent. Inflatables formed from the self-healing fabric disclosed herein may thus be more reliable and/or less prone to functional test failures and field failures and/or may provide for easier detection and repair of damage to the inflatable.

Figure 1:
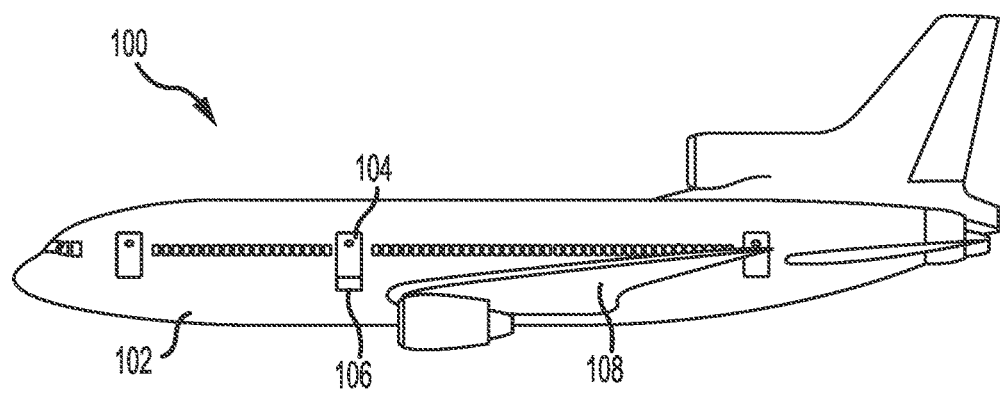
FIG. 1 illustrates an aircraft having an evacuation system, in accordance with various embodiments.

Referring now to FIG. 1, an aircraft 100 is shown. Aircraft 100 may include a fuselage 102 having plurality of exit doors, including an exit door 104. Aircraft 100 may include one or more evacuation systems positioned near a corresponding exit door. For example, aircraft 100 includes an evacuation system 106 positioned near exit door 104. In the event of an emergency, exit door 104 may be opened by a passenger or crew member of aircraft 100. In various embodiments, evacuation system 106 may deploy in response to exit door 104 being opened. Evacuation system 106 may also deploy in response to another action taken by a passenger or crew member such as, for example, depression of a button, actuation of a lever, or the like. While evacuation system 106 is disclosed as deploying from exit door 104, it is further contemplated and understood that evacuation system 106 may deploy from other locations. For example, evacuation system 106 may deploy from over a wing 108 of aircraft 100.

Figure 2:
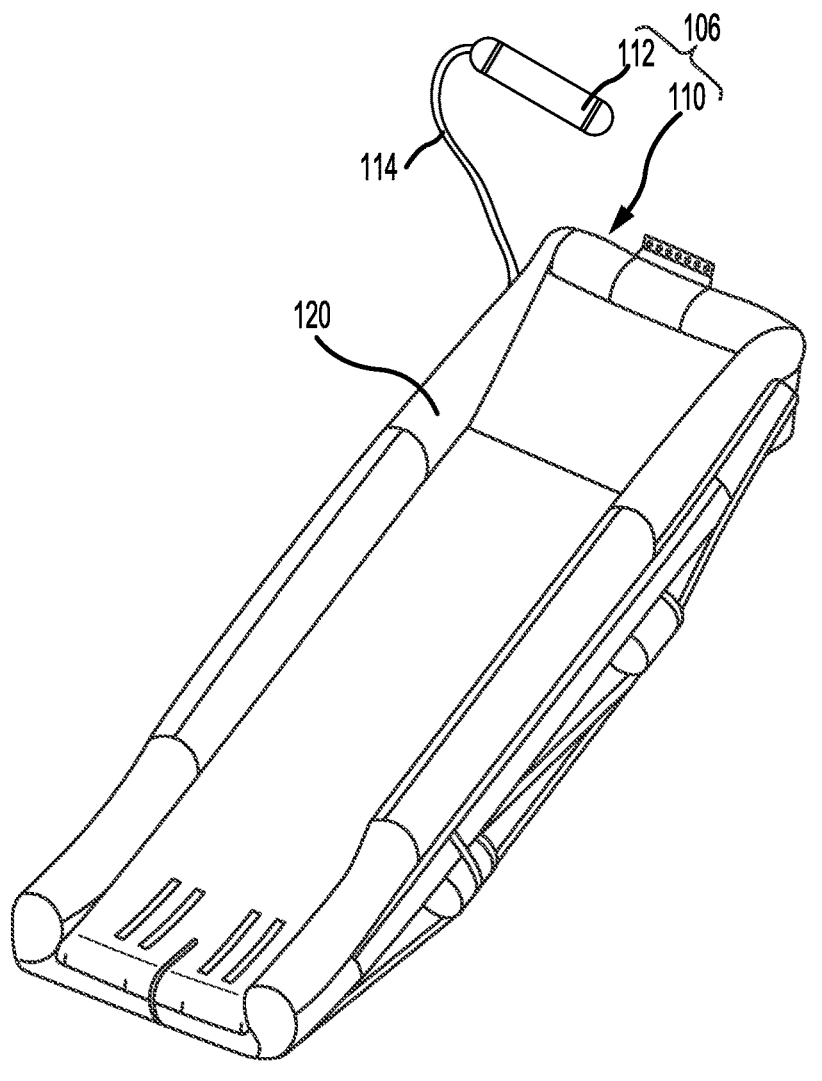
FIG. 2 illustrates a perspective view of an inflatable slide formed of a self-healing fabric, in accordance with various embodiments.

With reference to FIG. 2, additional details of evacuation system 106 are illustrated. In accordance with various embodiments. Evacuation system 106 includes an inflatable 110 and a compressed fluid source 112 (also referred to as a charge cylinder). Compressed fluid source 112 is fluidly coupled to inflatable 110 via a conduit 114. Compressed fluid source 112 is configured to provide a pressurized gas to inflate inflatable 110. In accordance with various embodiments, inflatable 110 is formed of a self-healing fabric 120. Self-healing fabric 120 defines one or more inflatable chambers configured to receive and retain fluid from compressed fluid source 112 during deployment inflatable 110. In this regard, self-healing fabric 120 defines the inflatable volume, or inflatable structures, of inflatable 110. In various embodiments, inflatable 110 is an evacuation slide, which may be deployed from an aircraft, such as aircraft 100 in FIG. 1. While FIG. 2 illustrates inflatable 110 as an evacuation slide, it is contemplated and understood that the self-healing fabric disclosed herein may be used to form other evacuation system inflatables, such as life rafts.

With reference to FIG. 3A, a cross-section view of self-healing fabric 120 is illustrated. In accordance with various embodiments, self-healing fabric 120 includes a fabric layer 122, an interior thermoplastic polymeric layer 124, and an exterior thermoplastic polymeric layer 126. Fabric layer 122 is located between interior thermoplastic polymeric layer 124 and exterior thermoplastic polymeric layer 126. Interior thermoplastic polymeric layer 124 may be oriented toward the interior of the inflatable chamber. Exterior thermoplastic polymeric layer 126 may be oriented away from the inflatable chamber. Interior thermoplastic polymeric layer 124 and exterior thermoplastic polymeric layer 126 form gas impermeable layers over opposing sides of fabric layer 122. In accordance with various embodiments, fabric layer 122 may be a woven layer. For example, fabric layer 122 comprise woven polyamide fiber, polyaramid fiber, polyurethane fiber, and/or polyester fiber.

Interior thermoplastic polymeric layer 124 and exterior thermoplastic polymeric layer 126 are each bonded to fabric layer 122. In various embodiments, interior thermoplastic polymeric layer 124 and exterior thermoplastic polymeric layer 126 are each extruded and then applied, in a hot molten state, to fabric layer 122 (e.g., the thermoplastic polymeric material goes directly from the extrusion dies onto the fabric layer). In various embodiments, interior thermoplastic polymeric layer 124 and exterior thermoplastic polymeric layer 126 are each bonded to fabric layer 122 via adhesive lamination. Interior thermoplastic polymeric layer 124 and exterior thermoplastic polymeric layer 126 may also be applied using other solution-based application techniques such as, for example, dipping, spraying, brushing. In this regard, interior thermoplastic polymeric layer 124 and exterior thermoplastic polymeric layer 126 may be formed over fabric layer 122 using any suitable application technique(s).

In accordance with various embodiments, interior thermoplastic polymeric layer 124 and exterior thermoplastic polymeric layer 126 each includes a thermoplastic polymeric material 127 having catalysts 128 and encapsulated healing agents 130 dispersed therein. Stated differently, catalysts 128 and encapsulated healing agents 130 may be dispersed in the thermoplastic polymeric material 127 of interior thermoplastic polymeric layer 124 and exterior thermoplastic polymeric layer 126.

With additional reference to FIG. 3B, an encapsulated healing agent 130 is illustrated. Encapsulated healing agent includes a healing agent 132 encapsulated within a shell (or encapsulant) 134. Healing agent 132 comprises monomers of the thermoplastic polymeric material 127 of interior and exterior thermoplastic polymeric layers 124, 126. Shell 134 comprises a micro or nano capsule made of polymers that are mechanically and thermally stable and non-reactive to the thermoplastic polymeric material 127 of interior and exterior thermoplastic polymeric layers 124, 126 during formation of the thermoplastic polymeric material 127 and/or during bonding of thermoplastic polymeric material 127 to fabric layer 122. Catalyst 128 comprises a material capable of being active in the thermoplastic polymeric material 127 and of catalyzing the polymerization of healing agent 132.

In various embodiments, thermoplastic polymeric material 127 comprises thermoplastic polyurethane. The thermoplastic polyurethane may be a product of the reaction of polyisocyanates and polyols in presence of chain extenders and catalysts. In various embodiments, healing agent 132 comprises isocyanate (e.g., diisocyanates such as toluene diisocyanate (TDI), methylene diphenyl diisocyanate (MDI), etc.) and/or an aliphatic group (e.g., hexamethylene diamine (HDA), isophorone diamine (IPDA), hydrogenated methylene dianiline (H12MDA), etc.), and shell 134 comprises urea formaldehyde (UF), melamine formaldehyde (MF), polyurethane (PU), or any other compatible polymer, and/or combinations thereof. Catalyst 128 may comprise a tin-based catalyst (e.g. dibutyl tin dilaurate) or an amine catalyst. The thermoplastic polymeric material 127 of interior and exterior thermoplastic polymeric layers 124, 126 may comprise polyols, such as polyether, polyester, polycaprolactone, and/or combinations thereof, and chain extenders, such as low molecular weight diols (e.g., butane diol, ethylene glycol, etc.).

Encapsulated healing agents 130 may be prepared via, for example, in-situ emulsion polymerization. For example, healing agent 132 may be dispersed in an aqueous solution containing polymers of shell 134 (e.g., in an aqueous solution containing UF, MF, and/or PU). The aqueous solution may then be heated and stirred to cause polymerization of the shell material over the healing agent, thereby generating encapsulated healing agents 130. Thermoplastic polymeric material 127 having catalysts 128 and encapsulated healing agents 130 may be made by mixing encapsulated healing agents 130, catalysts 128, and polyurethane polymer. The mixture is then applied to opposing sides of fabric layer 122. The mixture may be applied by dipping, spraying, brushing on, or any other suitable application technique. In various embodiments, the mixture of encapsulated healing agents 130, catalysts 128, and polyurethane polymer is extruded, and the extruded mixture is applied to opposing sides of fabric layer 122. In various embodiments, additional additives may be added to the mixture. For example, additives for flame resistance, fungus/microbial resistance, etc. may be added to the mixture that is applied to opposing sides of fabric layer 122.

Figure 4B:
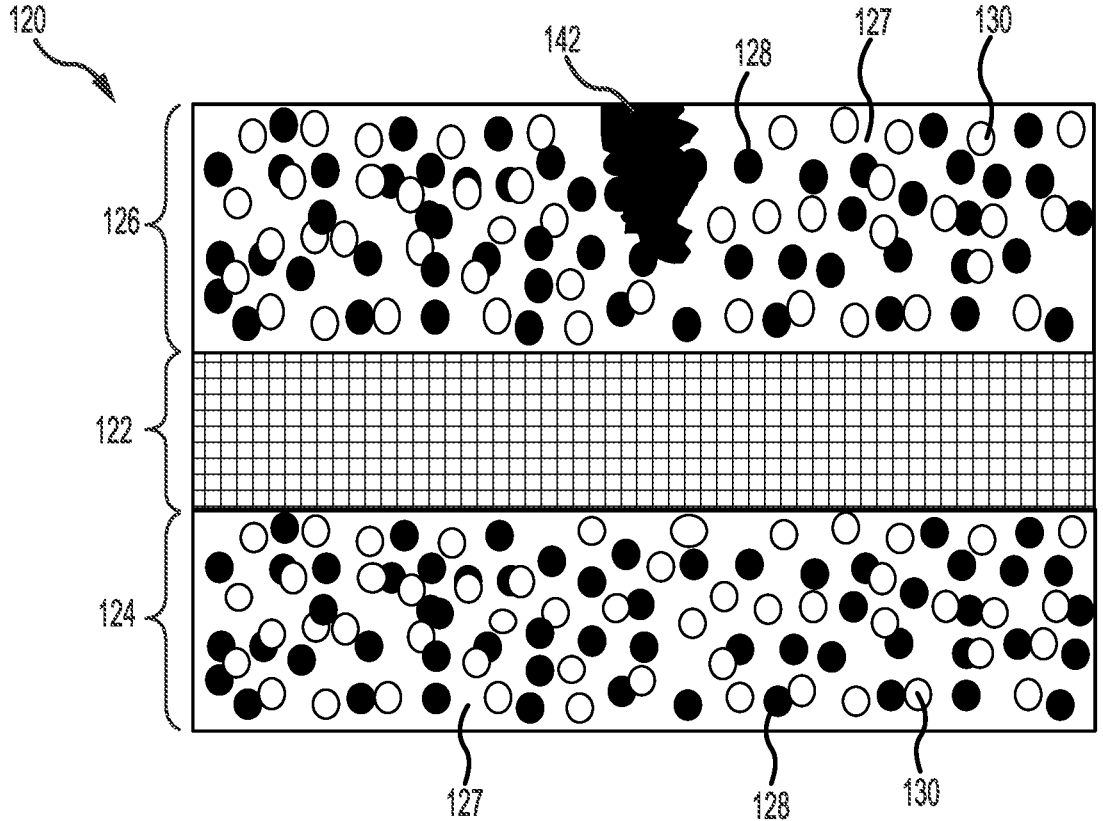

With reference to FIG. 4A, exterior thermoplastic polymeric layer 126 includes a damaged area 140 (e.g., a crack). The formation of damaged area 140 causes the encapsulated healing agents 130 located along damaged area 140 to break (i.e., the shell 134 separates), thereby allowing healing agent 132 to exit shell 134. Capillary action and/or surface tension draws the released healing agent 132 over the surfaces of damaged area 140. With additional reference to FIG. 4B, the released healing agent 132 polymerizes in the presence of the polyols, the chain extenders, and catalyst 128 in thermoplastic polymeric material 127, thereby filling damaged area 140. Stated differently, the isocyanates released from the broken encapsulated healing agents 130 contacts and reacts with the polyols, chain extenders, and catalysts 128 in thermoplastic polymeric material 127 to form new thermoplastic polyurethane 142 in damaged area 140.

In various embodiments, encapsulated healing agents 130 may also include a dye and/or a photochromatic additive configured to become visible upon healing agent 132 being released from shell 134. Including a dye and/or photochromatic additive that becomes visible in new thermoplastic polyurethane 142 may allow for better recognition of areas that experience damage. Recognizing areas that are prone to damage may alert manufacturers, testers, and/or other persons handling inflatable 110 to issues that may not otherwise be readily apparent.

Figure 5A:
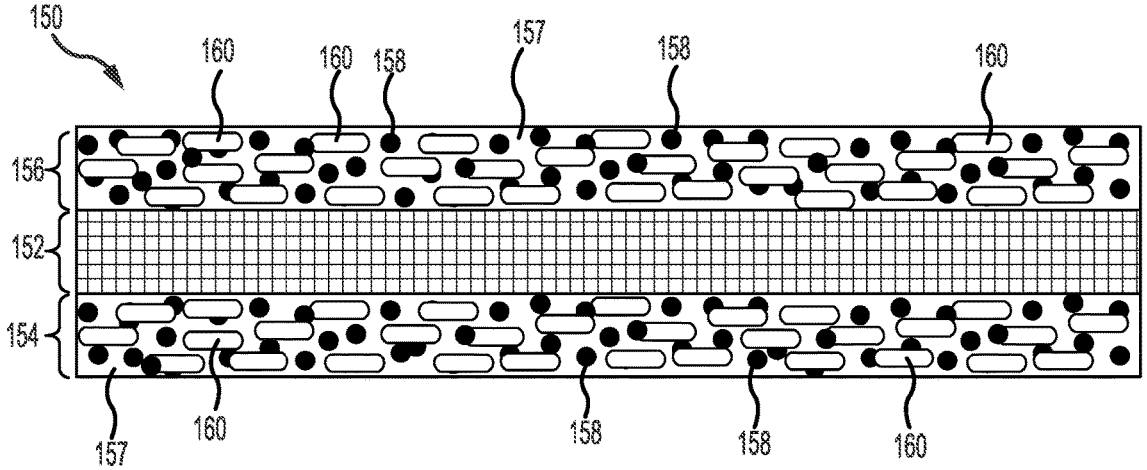
FIG. 5A illustrates a cross-section view of a self-healing fabric for an evacuation system inflatable, the self-healing including hollow fiber healing agent, in accordance with various embodiments.

With reference to FIG. 5A, a cross-section view of a self-healing fabric 150 is illustrated. In accordance with various embodiments, inflatable 110 in FIG. 2 may be formed using self-healing fabric 150 instead of self-healing fabric 120. Self-healing fabric 150 includes a fabric layer 152, an interior thermoplastic polymeric layer 154, and an exterior thermoplastic polymeric layer 156. Fabric layer 152 is located between interior thermoplastic polymeric layer 154 and exterior thermoplastic polymeric layer 156.

Interior thermoplastic polymeric layer 154 is oriented toward the interior volume of the inflatable chamber. Exterior thermoplastic polymeric layer 156 is oriented away from the interior volume of the inflatable chamber. Interior thermoplastic polymeric layer 154 and exterior thermoplastic polymeric layer 156 form gas impermeable layers over opposing sides of fabric layer 152. In accordance with various embodiments, fabric layer 152 may be a woven layer. In various embodiments, fabric layer 152 may comprise woven polyamide fiber, polyaramid fiber, polyurethane fiber, and/or polyester fiber.

Interior thermoplastic polymeric layer 154 and exterior thermoplastic polymeric layer 156 are each bonded to fabric layer 152. In various embodiments, interior thermoplastic polymeric layer 154 and exterior thermoplastic polymeric layer 156 are each extruded and then applied, in a hot molten state, to fabric layer 152 (e.g., the thermoplastic polymeric material goes directly from the extrusion dies onto the fabric layer). In various embodiments, interior thermoplastic polymeric layer 154 and exterior thermoplastic polymeric layer 156 are each bonded to fabric layer 152 via adhesive lamination. Interior thermoplastic polymeric layer 154 and exterior thermoplastic polymeric layer 156 may also be applied using other solution-based application techniques such as, for example, dipping, spraying, brushing, etc. In this regard, interior thermoplastic polymeric layer 154 and exterior thermoplastic polymeric layer 156 may be formed over fabric layer 152 using any suitable application technique(s).

In accordance with various embodiments, interior thermoplastic polymeric layer 154 and exterior thermoplastic polymeric layer 156 each includes a thermoplastic polymeric material 157 having catalysts 158 and hollow fiber healing agents 160 dispersed therein. Stated differently, catalysts 158 and hollow fiber healing agents 160 may be dispersed in the thermoplastic polymeric material 157 of interior thermoplastic polymeric layer 154 and exterior thermoplastic polymeric layer 156. In various embodiments, thermoplastic polymeric material 157 comprises a thermoplastic polyurethane material similar to thermoplastic polymeric material 127 in FIG. 3A.

Figure 5B:
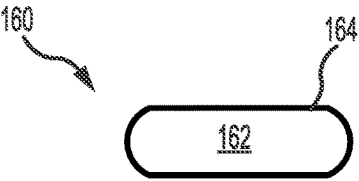
FIG. 5B illustrates a hollow fiber healing agent of the self-healing fabric of FIG. 5A, in accordance with various embodiments.

With additional reference to FIG. 5B, each hollow fiber healing agent 160 includes a healing agent 162 located within a hollow fiber membrane 164. Healing agent 162 is similar to heal agent 132 in FIGS. 3A and 3B. Hollow fiber membranes 164 comprise polymers that are mechanically and thermally stable and non-reactive to the thermoplastic polymeric material 157 during formation of the thermoplastic polymeric material 157 and during bonding of thermoplastic polymeric material 157 to fabric layer 152. Catalyst 158 is similar to catalyst 128 in FIG. 3A. Hollow fiber membranes 164 may be formed by melt spinning, dry spinning, dry jet spinning, wet spinning, or any other suitable hollow fiber formation technique. In various embodiments, hollow fiber membranes 164 comprise carbon nano tubes. In various embodiments, vacuum assisted infiltration techniques are employed to fill (or at least partially fill) hollow fiber membranes 164 with healing agent 162, thereby forming hollow fiber healing agents 160.

Thermoplastic polymeric material 157 having catalysts 158 and hollow fiber healing agents 160 (i.e., hollow fiber membranes 164 filled with healing agent 162) may be made by mixing hollow fiber healing agents 160, catalysts 168, and polyurethane polymer. The mixture is then applied to opposing sides of fabric layer 152. The mixture may be applied by dipping, spraying, brushing on, or any other suitable application technique. In various embodiments, the hollow fiber healing agents 160, catalysts 168, and polyurethane polymer mixture is extruded and the extruded mixture is applied to opposing sides of fabric layer 152. In various embodiments, additional additives may be added to the mixture. For example, additives for flame resistance, fungus/microbial resistance, etc. may be added to the mixture that is applied to opposing sides of fabric layer 152.

Hollow fiber healing agents 160 allow self-healing fabric 150 to autonomously repair itself. In this regard, should interior thermoplastic polymeric layer 154 and/or exterior thermoplastic polymeric layer 156 become damaged (e.g., cracked), the hollow fiber healing agents 160 located along the damaged area will break (i.e., the hollow fiber membrane or carbon nano tube separates), thereby allowing healing agent 162 to exit the hollow fiber membrane or carbon nano tube. Capillary action and/or surface tension draws the released healing agent 162 over the surfaces of the damaged area. The released healing agent 162 polymerizes in the presence the polyols, the chain extenders, and catalysts 158 in thermoplastic polymeric material 157, thereby filling damaged area. Stated differently, the isocyanates released from the broken hollow fiber healing agents 160 contacts and reacts with the polyols, chain extenders, and catalysts 158 in thermoplastic polymeric material 157 to form new thermoplastic polyurethane in the damaged area. In various embodiments, hollow fiber healing agents 160 may also include a dye and/or photochromatic additive configured to become visible upon healing agent 162 being released from hollow fiber membrane 164.

Figure 6:
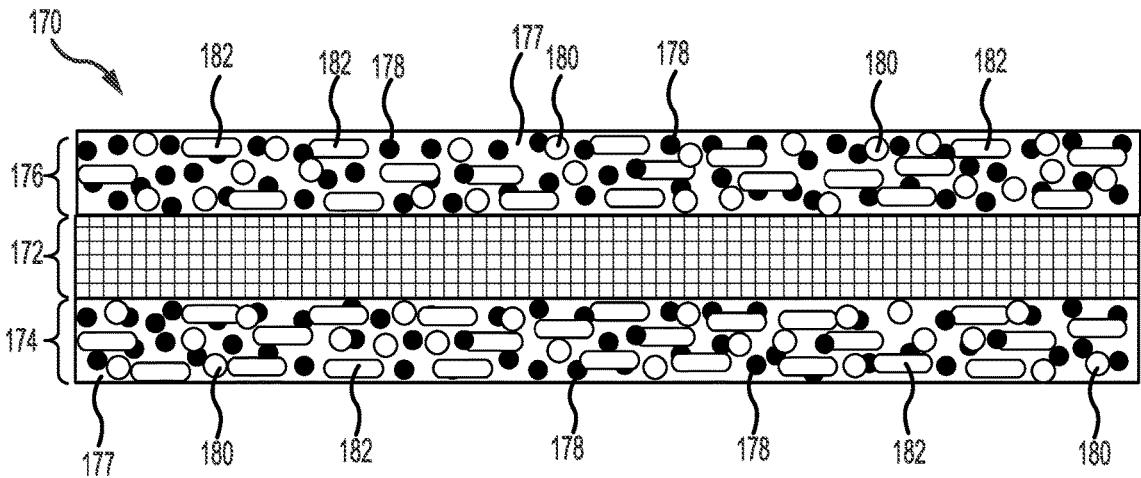
FIG. 6 illustrates a cross-section view of a self-healing fabric for an evacuation system inflatable, the self-healing fabric including microencapsulated healing agent and hollow fiber healing agent, in accordance with various embodiments.

With reference to FIG. 6, a cross-section view of a self-healing fabric 170 is illustrated. In accordance with various embodiments, inflatable 110 in FIG. 2 may be formed of self-healing fabric 170 instead of self-healing fabric 120. Self-healing fabric 170 includes a fabric layer 172, an interior thermoplastic polymeric layer 174, and an exterior thermoplastic polymeric layer 176. Fabric layer 172 is located between interior thermoplastic polymeric layer 174 and exterior thermoplastic polymeric layer 176.

Interior thermoplastic polymeric layer 174 and exterior thermoplastic polymeric layer 176 are each bonded to fabric layer 172 and form gas impermeable layers over opposing sides of fabric layer 172, which is similar to fabric layer 122 in FIG. 3A. In accordance with various embodiments, interior thermoplastic polymeric layer 174 and exterior thermoplastic polymeric layer 176 each includes a thermoplastic polymeric material 177, which is similar to thermoplastic polymeric material 127 in FIG. 3A. Thermoplastic polymeric material 177 includes catalysts 178, encapsulated healing agents 180, and hollow fiber healing agents 182 dispersed therein. Stated differently, catalysts 178, encapsulated healing agents 180, and hollow fiber healing agents 182 may be dispersed in the thermoplastic polymeric material 177 of interior thermoplastic polymeric layer 174 and exterior thermoplastic polymeric layer 176. In various embodiments, thermoplastic polymeric material 177 comprises a thermoplastic polyurethane material similar to thermoplastic polymeric material 127 in FIG. 3A. Encapsulated healing agents 180 are similar to encapsulated heating agents 130 in FIGS. 3A and 3B. Hollow fiber healing agents 182 are similar to hollow fiber heating agents 160 in FIGS. 5A and 5B.

Thermoplastic polymeric material 177 having catalysts 178, encapsulated healing agents 180, and hollow fiber healing agents 182 may be made by mixing catalysts 178, encapsulated healing agents 180, hollow fiber healing agents 182, and polyurethane polymer. The mixture is then applied to opposing sides of fabric layer 172. The mixture may be applied to fabric layer 172 by dipping, spraying, brushing on, or any other suitable application technique. In various embodiments, the catalysts 178, encapsulated healing agents 180, hollow fiber healing agents 182, and polyurethane polymer mixture is extruded and the extruded mixture is applied to opposing sides of fabric layer 172. In various embodiments, additional additives may be added to the mixture. For example, additives for flame resistance, fungus/microbial resistance, etc. may be added to the mixture that is applied to opposing sides of fabric layer 172. Encapsulated healing agents 180 and hollow fiber healing agents 182 allow self-healing fabric 170 to autonomously repair in a manner similar to self-healing fabric 120 in FIGS. 4A and 4B and to self-healing fabric 150 in FIG. 5A.

Figure 7:
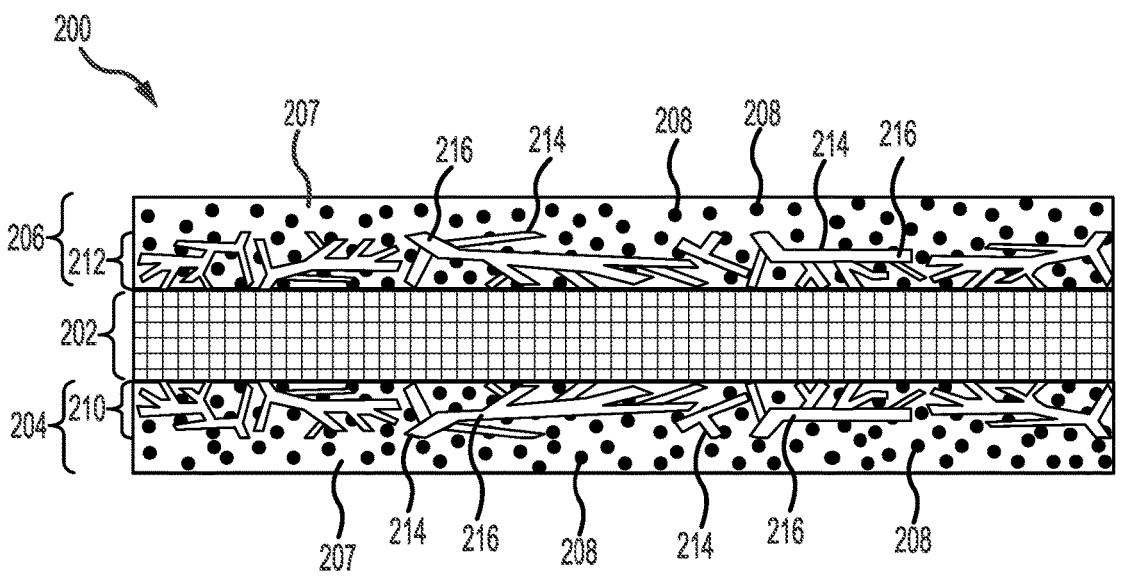
FIG. 7 illustrates a cross-section view of a self-healing fabric for an evacuation system inflatable, the self-healing fabric including a vascular network of healing agent, in accordance with various embodiments.

With reference to FIG. 7, a cross-section view of a self-healing fabric 200 is illustrated. In accordance with various embodiments, inflatable 110 in FIG. 2 may be formed using self-healing fabric 200 instead of self-healing fabric 120. Self-healing fabric 200 includes a fabric layer 202, an interior thermoplastic polymeric layer 204, and an exterior thermoplastic polymeric layer 206. Fabric layer 202 is located between interior thermoplastic polymeric layer 204 and exterior thermoplastic polymeric layer 206.

Interior thermoplastic polymeric layer 204 and exterior thermoplastic polymeric layer 206 form gas impermeable layers over opposing sides of fabric layer 202. In accordance with various embodiments, fabric layer 202 may be a woven layer. In various embodiments, fabric layer 202 may comprise woven polyamide fiber, polyaramid fiber, polyurethane fiber, and/or polyester fiber. Interior thermoplastic polymeric layer 204 and exterior thermoplastic polymeric layer 206 each includes a thermoplastic polymeric material 207. In various embodiments, thermoplastic polymeric material 207 may have catalysts 208 dispersed therein. Stated differently, catalysts 208 may be dispersed in the thermoplastic polymeric material 207 of interior thermoplastic polymeric layer 204 and exterior thermoplastic polymeric layer 206. In various embodiments, thermoplastic polymeric material 207 comprises a thermoplastic polyurethane material similar to thermoplastic polymeric material 127 in FIG. 3A.

In accordance with various embodiments, an interior vascular network 210 is formed over a first side of fabric layer 202, and an exterior vascular network 212 is formed over a second, opposing side of fabric layer 202. Interior vascular network 210 and exterior vascular network 212 each include a plurality of interconnected channels 214 containing healing agent 216. In various embodiments, interconnected channels 214 may be formed of a polymer material. The polymer material forming interconnected channels 214 may be formed over fabric layer 202 using any suitable formation technique. In various embodiments, interconnected channels 214 may be formed using additive manufacturing (e.g., 3D printing). The polymer material forming interconnected channels 214 may be any polymer material that is mechanically and thermally stable and non-reactive to the thermoplastic polymeric material 207 during application of the thermoplastic polymeric material 207 to fabric layer 202. Thermoplastic polymeric material 207, including catalysts 208, may be applied over fabric layer 202 and vascular networks 210, 212 by dipping, spraying, brushing on, or any other suitable application technique. In various embodiments, thermoplastic polymeric material 207, including catalysts 208, is extruded and then applied, in a hot molten state, over fabric layer 202 and vascular networks 210, 212 (i.e., the thermoplastic polymeric material goes directly from the extrusion dies onto the fabric layer and vascular networks). In various embodiments, thermoplastic polymeric material 207, including catalysts 208, may be bonded to fabric layer 202 via adhesive lamination.

In various embodiments, interconnected channels 214 may be defined by thermoplastic polymeric material 207. For example, thermoplastic polymeric material 207, including catalysts 208, may be applied over a removable material configured in the desired shape of interconnected channels 214. After applying thermoplastic polymeric material 207, the removable material is removed, leaving interconnected channels 214, which are devoid of material, in thermoplastic polymeric material 207.

Interconnected channels 214 are filled (or at least partially filled) with healing agent 216. In various embodiments, vacuum assisted infiltration techniques are employed to fill (or at least partially fill) interconnected channels 214 with healing agent 216. Healing agent 216 is similar to heal agent 132 in FIGS. 3A and 3B.

Vascular networks 210, 212, including healing agent 216, allow self-healing fabric 200 to autonomously repair itself. In this regard, should interior thermoplastic polymeric layer 204 and/or exterior thermoplastic polymeric layer 206 become damaged (e.g., cracked), the portion of the vascular network 210, 212 located along the damaged area will break, thereby allowing healing agent 216 to exit the vascular network 210, 212. Capillary action and/or surface tension draws the released healing agent 216 over the surfaces of the damaged area. The released healing agent 216 polymerizes in the presence the polyols, the chain extenders, and catalysts 208 in thermoplastic polymeric material 207, thereby filling the damaged area. Stated differently, the isocyanates released from the broken vascular network contacts and reacts with the polyols, chain extenders, and catalysts 208 in thermoplastic polymeric material 207 to form new thermoplastic polyurethane in the damaged area. In various embodiments, vascular networks 210, 212 may also comprise a dye and/or a photochromatic additive configured to become visible upon healing agent 216 being released from vascular network 210, 212.

Figure 8:
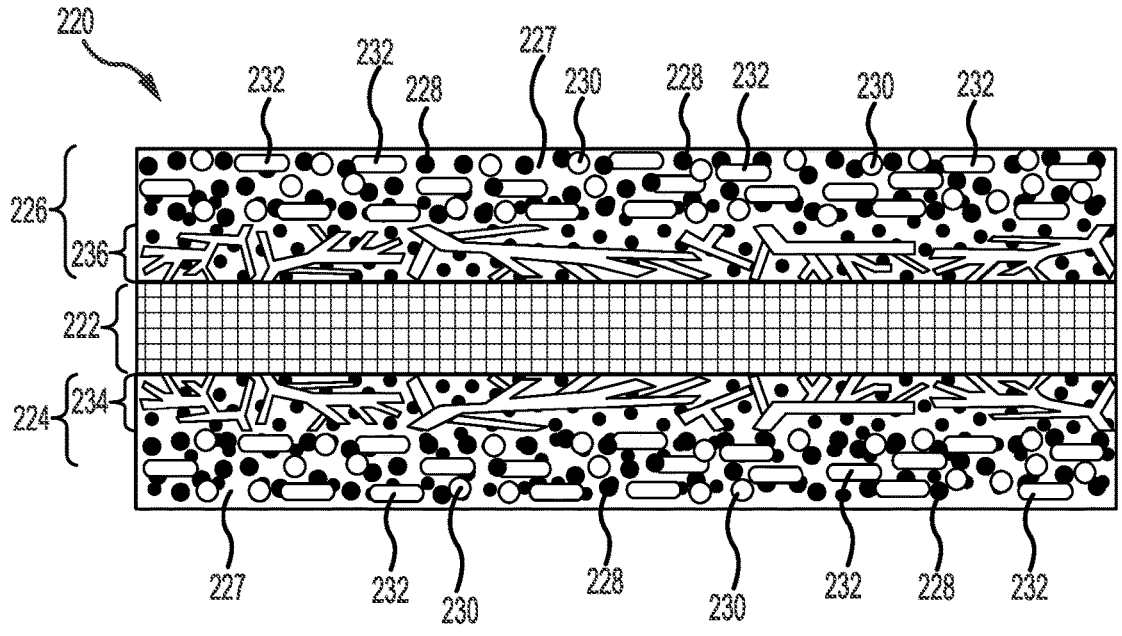
FIG. 8 illustrates a cross-section view of a self-healing fabric for an evacuation system inflatable, the self-healing fabric including microencapsulated healing agent, hollow fiber healing agent, and a vascular network of healing agent, in accordance with various embodiments.

With reference to FIG. 8, a cross-section view of a self-healing fabric 220 is illustrated. In accordance with various embodiments, inflatable 110 in FIG. 2 may be formed using self-healing fabric 220 instead of self-healing fabric 120. Self-healing fabric 220 includes a fabric layer 222, an interior thermoplastic polymeric layer 224, and an exterior thermoplastic polymeric layer 226. Fabric layer 222, which is similar to fabric layer 122 in FIG. 3A, is located between interior thermoplastic polymeric layer 224 and exterior thermoplastic polymeric layer 226.

Interior thermoplastic polymeric layer 224 and exterior thermoplastic polymeric layer 226 form gas impermeable layers over opposing sides of fabric layer 222. Interior thermoplastic polymeric layer 224 and exterior thermoplastic polymeric layer 226 each include a thermoplastic polymeric material 227. Thermoplastic polymeric material 227 includes catalysts 228, encapsulated healing agents 230, and hollow fiber healing agents 232 dispersed therein. Stated differently, catalysts 228, encapsulated healing agents 230, and hollow fiber healing agents 232 may be dispersed in the thermoplastic polymeric material 227 of interior thermoplastic polymeric layer 224 and exterior thermoplastic polymeric layer 226. In various embodiments, thermoplastic polymeric material 227 comprises a thermoplastic polyurethane material similar to thermoplastic polymeric material 127 in FIG. 3A. Encapsulated healing agents 230 are similar to encapsulated heating agents 130 in FIGS. 3A and 3B. Hollow fiber healing agents 232 are similar to hollow fiber heating agents 160 in FIGS. 5A and 5B.

In accordance with various embodiments, an interior vascular network 234 is formed over a first side of fabric layer 222, and an exterior vascular network 236 is formed over a second, opposing side of fabric layer 222. Interior vascular network 234 and exterior vascular network 236 are similar, respectively, to interior vascular network 210 and exterior vascular network 212 in FIG. 7. In this regard, a healing agent, similar to healing agent 132 in FIGS. 3A and 3B, is located within the interconnected channels of interior vascular network 234, and a healing agent, similar to healing agent 132 in FIGS. 3A and 3B, is located within the interconnected channels of exterior vascular network 236.

In accordance with various embodiments, thermoplastic polymeric material 227, including catalysts 228, encapsulated healing agents 230, and hollow fiber healing agents 232 is located over interior and exterior vascular networks 234, 236. Thermoplastic polymeric material 227, including catalysts 228, encapsulated healing agents 230, and hollow fiber healing agents 232, may be applied over fabric layer 222 and vascular networks 234, 236 by dipping, spraying, brushing on, or any other suitable application technique. In various embodiments, thermoplastic polymeric material 227, including catalysts 228, encapsulated healing agents 230, and hollow fiber healing agents 232 is extruded and then applied, in a hot molten state, over fabric layer 222 and vascular networks 234, 236. In various embodiments, thermoplastic polymeric material 227, including catalysts 208, encapsulated healing agents 230, and hollow fiber healing agents 232, may be bonded to fabric layer 202 via adhesive lamination. In various embodiments, vascular networks 234, 236 and/or encapsulated healing agents 230 and/or hollow fiber healing agents 232 may also comprise a dye and/or a photochromatic additive configured to become visible upon the healing agent being released.

Figure 9:
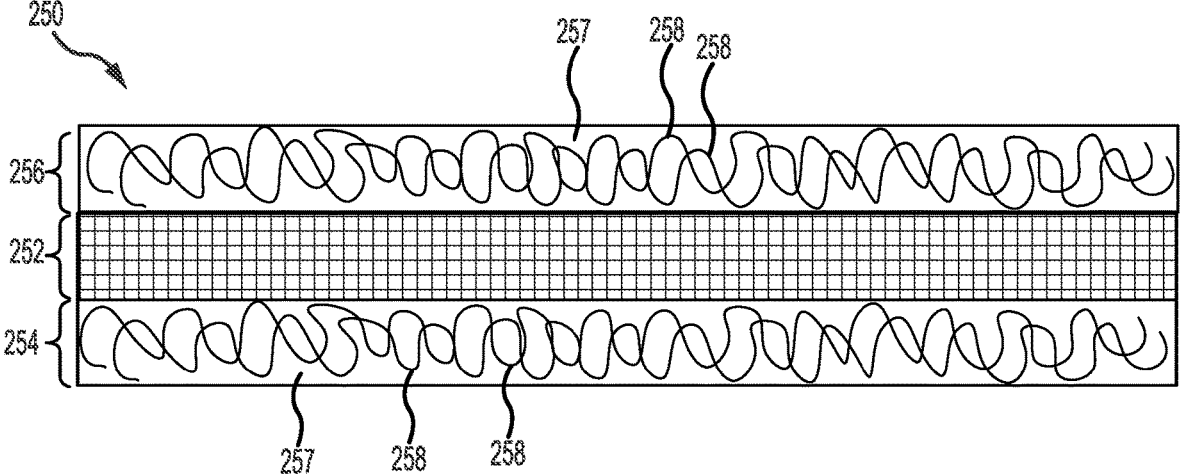
FIG. 9 illustrates a cross-section view of a non-autonomous self-healing fabric for an evacuation system inflatable, in accordance with various embodiments.

With reference to FIG. 9, a cross-section view of a self-healing fabric 250 is illustrated. In accordance with various embodiments, inflatable 110 in FIG. 2 may be formed using self-healing fabric 250 instead of self-healing fabric 120. Self-healing fabric 250 includes a fabric layer 252, an interior thermoplastic polymeric layer 254, and an exterior thermoplastic polymeric layer 256. Fabric layer 252, which is similar to fabric layer 122 in FIG. 3A, is located between interior thermoplastic polymeric layer 254 and exterior thermoplastic polymeric layer 256.

Interior thermoplastic polymeric layer 254 and exterior thermoplastic polymeric layer 256 form gas impermeable layers over opposing sides of fabric layer 252. Interior thermoplastic polymeric layer 254 and exterior thermoplastic polymeric layer 256 each include a thermoplastic polymeric material 257. In various embodiments, thermoplastic polymeric material 257 comprises a thermoplastic polyurethane material similar to thermoplastic polymeric material 127 in FIG. 3A.

In various embodiments, the thermoplastic polymeric material 257 includes healing polymers 258. Healing polymers 258 may be polycaprolactone, polylactic acid, polyester, and/or any other polymer, which has a lower glass transition temperature (Tg) and/or a lower thermal transition temperature (Tm) than the thermoplastic polymeric material 257 (e.g., a lower Tg and/or lower Tm than thermoplastic polyurethane polymer). In various embodiments, healing polymers 258 may comprise blocked isocyanates and auto-catalytic polyols, and/or any other chemical group that is thermally stable and non-reactive to the thermoplastic polymeric material 257 during formation of thermoplastic polymeric material 257 and during application of the thermoplastic polymeric material 257 to fabric layer 252.

Healing polymers 258 are configured to form a dynamic reversible bonding chemistry with thermoplastic polymeric material 257, upon external stimulus. In this regard, healing polymers 258 become unblocked and/or reactive in response to external stimuli. For example, in response to application of heat, ultraviolet light, and/or pressure, healing polymers 258 and thermoplastic polymeric material 257 form new thermoplastic polyurethane.

Thermoplastic polymeric material 257, including healing polymers 258, allows for non-autonomous repair of self-healing fabric 250. In this regard, should interior thermoplastic polymeric layer 254 and/or exterior thermoplastic polymeric layer 256 become damaged (e.g., cracked), stimuli (e.g., heat, ultraviolet light, and/or pressure) may be applied to the damaged area, thereby causing healing polymers 258 to fill the damaged area. Stated differently, the damaged area may be healed by reversible bonding chemistry (e.g., covalent and non-covalent interactions) between healing polymers 258 and thermoplastic polymeric material 257 brought about in response to external stimuli.

Figure 10A:
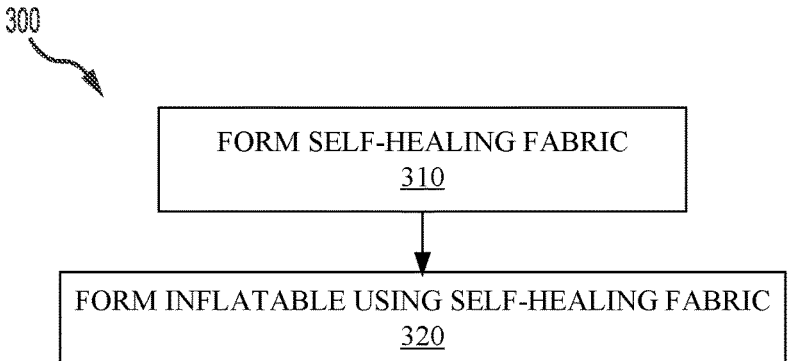
FIGS. 10A, 10B, 10C, 10D, and 10E illustrate a method of forming an inflatable having self-healing fabric for an evacuation system, in accordance with various embodiments.
Figure 10B:
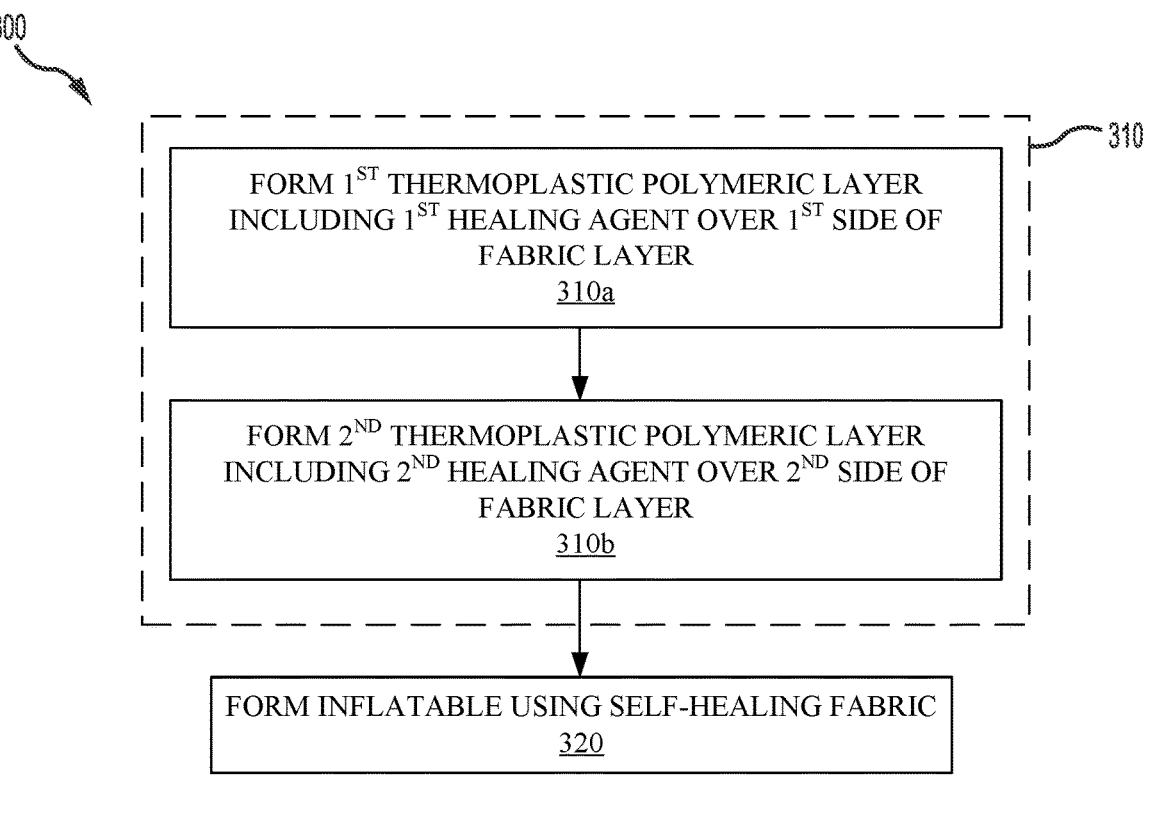

With reference to FIG. 10A, a method 300 of forming an inflatable for an evacuation system is illustrated. Method 300 may comprise forming a self-healing (step 310) and forming an inflatable chamber of the inflatable using the self-healing fabric (step 320). With reference to FIG. 10B, step 310 of method 300 may include forming a first thermoplastic polymeric layer including a first healing agent over a first side of a fabric layer (step 310a) and forming a second thermoplastic polymeric layer including a second healing agent over a second side of the fabric layer (step 310b).

Figure 10C:
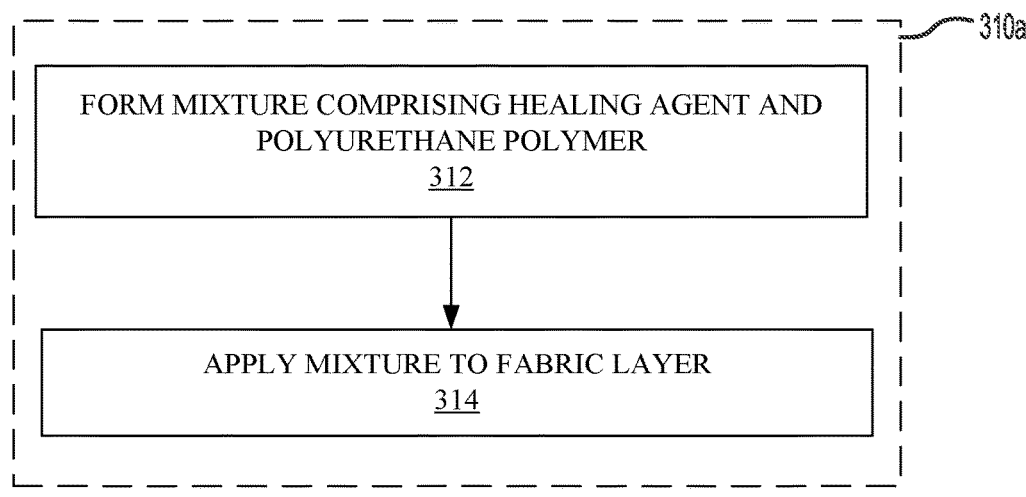

With reference to FIG. 10C, in various embodiments, step 310a may comprise forming a mixture comprising the first healing agent and polyurethane polymer (step 312) and applying the mixture to the first side of the fabric layer (step 314). It is contemplated and understood that step 310b may include steps similar to the steps described for step 310a. In various embodiments, the first healing agent comprises a monomer of polyurethane polymer. In various embodiments, the first healing agent comprises a healing polymer. The healing polymer may include at least one of polycaprolactone, polylactic acid, polyester, or a blocked isocyanate and an autocatalytic polyol. In various embodiments, the mixture formed in step 312 may further comprise a catalyst. The catalyst comprises a material capable of being active in polyurethane polymer and of catalyzing the polymerization of the healing agent. In various embodiments, the catalyst may comprise a tin-based catalyst (e.g. dibutyl tin dilaurate) or an amine catalyst.

In various embodiments, step 314 may including extruding the mixture formed in step 312 and applying the extruded mixture to the first side of the fabric layer. In various embodiments, step 314 may include applying the mixture formed in step 312 to the fabric layer by brushing the mixture on the fabric layer, spraying the mixture on the fabric layer, or dipping the fabric layer in the mixture.

Figure 10D:
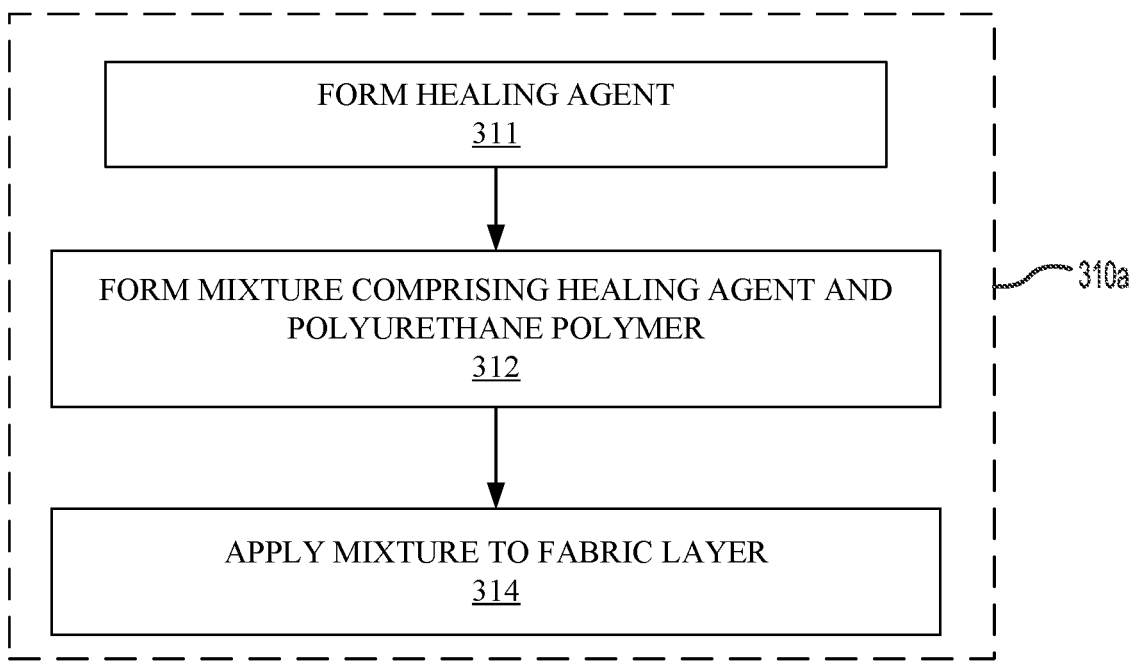

With reference to FIG. 10D, in various embodiments step 310a may further include forming the first healing agent (step 311). In various embodiments, step 311 includes dispersing a monomer of polyurethane polymer in an aqueous solution containing at least one of urea formaldehyde, melamine formaldehyde, or polyurethane and heating and stirring the aqueous solution to polymerize the at least one of urea formaldehyde, melamine formaldehyde, or polyurethane and encapsulate the monomer of polyurethane polymer within the at least one of urea formaldehyde, melamine formaldehyde, or polyurethane. In various embodiments, step 311 may include forming at least one of a hollow fiber member or a carbon nano tube and filling, at least partially, the at least one of the hollow fiber member or the carbon nano tube with the monomer of polyurethane polymer.

Figure 10E:
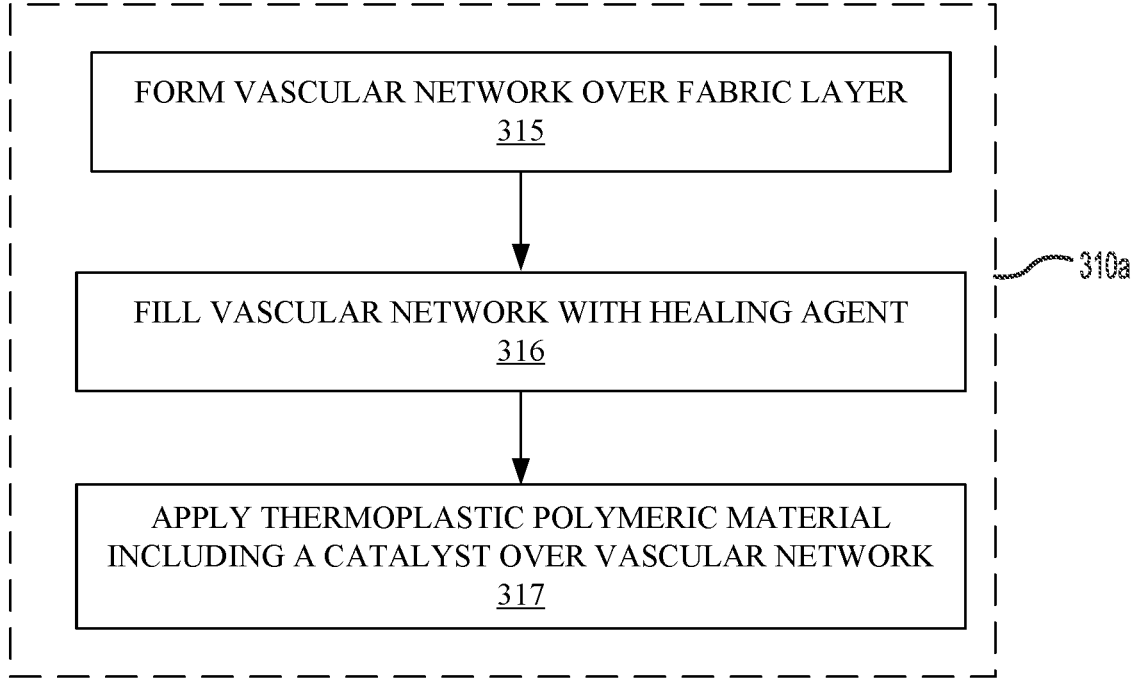

With reference to FIG. 10E, in various embodiments, step 310a may comprise forming a vascular network over the first side of the fabric layer (step 315), filling, at least partially, the vascular network with the first healing agent (step 316), and applying a mixture, including a thermoplastic polymeric material and a catalyst, over the first vascular network (step 317). In various embodiments, the mixture of step 317 may further include at least one of a plurality encapsulated healing agents (similar to encapsulated healing agents 130 in FIGS. 3A and 3B) or a plurality hollow fiber healing agents (similar to hollow fiber healing agents 160 in FIGS. 5A and 5B) dispersed therein. In various embodiments, the mixture applied in step 317 may further include a plurality of healing polymers (similar to healing polymers 258 in FIG. 9) dispersed therein. In various embodiments, thermoplastic polymeric material comprises thermoplastic polyurethane. In various embodiments, the catalyst comprises a material capable of being active in the thermoplastic polymeric material and of catalyzing the polymerization of the healing agent. In various embodiments, the catalyst may comprise a tin-based catalyst (e.g. dibutyl tin dilaurate) or an amine catalyst.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A self-healing fabric for an inflatable of an evacuation system, comprising:
    a fabric layer;
    an interior thermoplastic polymeric layer formed over a first side of the fabric layer, the interior thermoplastic polymeric layer including a first healing agent; and
    an exterior thermoplastic polymeric layer formed over a second side of the fabric layer, the second side being opposite the first side, the exterior thermoplastic polymeric layer including a second healing agent,
    wherein the interior thermoplastic polymeric layer and the exterior thermoplastic polymeric layer each includes a thermoplastic polymeric material with catalysts and encapsulated healing agents of the first healing agent and the second healing agent, respectively, which are dispersed therein, wherein the thermoplastic polymeric material includes polyols, wherein the polyols include at least one of polyether, polyester, or polycaprolactone, wherein the catalysts include a tin-based catalyst, and wherein the encapsulated healing agents includes at least one of isocyanate or an aliphatic group.

2. The self-healing fabric of claim 1, wherein the first healing agent is encapsulated within a shell comprising at least one of urea formaldehyde, melamine formaldehyde, or polyurethane.

3. The self-healing fabric of claim 1, wherein the first healing agent is encapsulated within at least one of a hollow fiber membrane or a carbon nano tube.

4. The self-healing fabric of claim 1, further comprising a vascular network formed over the first side of the fabric layer, the vascular network comprising a plurality of interconnected channels located in the interior thermoplastic polymeric layer, wherein the first healing agent is located in the plurality of interconnected channels of the vascular network.

5. The self-healing fabric of claim 4, further comprising at least one of a plurality of encapsulated healing agents or a plurality of hollow fiber healing agents dispersed in the interior thermoplastic polymeric layer.

6. The self-healing fabric of claim 1, wherein the interior thermoplastic polymeric layer comprises thermoplastic polyurethane.

7. The self-healing fabric of claim 6, wherein the first healing agent comprises a monomer of thermoplastic polyurethane.

8. The self-healing fabric of claim 6, wherein the first healing agent comprises a diisocyanate.

9. The self-healing fabric of claim 6, wherein the first healing agent comprises a healing polymer, the healing polymer including at least one of polycaprolactone, polylactic acid, polyester or a blocked isocyanate and an autocatalytic polyol.

10. An inflatable for an evacuation system, the inflatable comprising:
    a self-healing fabric defining an inflation chamber, wherein the self-healing fabric comprises:
    a fabric layer;
    an interior thermoplastic polymeric layer formed over the fabric layer and oriented toward the inflation chamber, the interior thermoplastic polymeric layer including a first healing agent; and
    an exterior thermoplastic polymeric layer formed over the fabric layer and oriented away from the inflation chamber, the exterior thermoplastic polymeric layer including a second healing agent.

11. The inflatable of claim 10, wherein the interior thermoplastic polymeric layer and the exterior thermoplastic polymeric layer each comprises thermoplastic polyurethane.

12. The inflatable of claim 11, wherein the first healing agent is encapsulated within a shell comprising at least one of urea formaldehyde, melamine formaldehyde, or polyurethane.

13. The inflatable of claim 11, wherein the first healing agent is encapsulated within at least one of a hollow fiber membrane or a carbon nano tube.

14. The inflatable of claim 10, wherein the self-healing fabric comprises:
    a first vascular network formed over a first side of the fabric layer, the first vascular network including a plurality of first interconnected channels located in the interior thermoplastic polymeric layer, wherein the first healing agent is located in the plurality of first interconnected channels of the first vascular network; and
    a second vascular network formed over a second side of fabric layer, the second vascular network including a plurality of second interconnected channels located in the exterior thermoplastic polymeric layer, wherein the second healing agent is located in the plurality of second interconnected channels of the second vascular network.

15. The inflatable of claim 14, wherein the interior thermoplastic polymeric layer defines the plurality of first interconnected channels.

16. The inflatable of claim 10, wherein the first healing agent comprises a healing polymer, the healing polymer including at least one of polycaprolactone, polylactic acid, polyester or a blocked isocyanate and an autocatalytic polyol.

17. A method of forming an inflatable for an evacuation system, the method comprising:
    forming a self-healing fabric by:
        forming a first thermoplastic polymeric layer including a first healing agent over a first side of a fabric layer; and
        forming a second thermoplastic polymeric layer including a second healing agent over a second side of the fabric layer; and
    forming an inflatable chamber of the inflatable using the self-healing fabric.

18. The method of claim 17, wherein forming the first thermoplastic polymeric layer including the first healing agent over the first side of the fabric layer comprises:
    forming a mixture comprising the first healing agent and polyurethane polymer; and
    applying the mixture to the first side of the fabric layer, wherein the first healing agent comprises at least one of a monomer of polyurethane polymer or a healing polymer, the healing polymer including at least one of polycaprolactone, polylactic acid, polyester, or a blocked isocyanate and an autocatalytic polyol.

19. The method of claim 18, wherein the first healing agent comprises the monomer of polyurethane polymer, and wherein forming the first thermoplastic polymeric layer including the first healing agent over the first side of the fabric layer further comprises forming the first healing agent by:
    dispersing the monomer of polyurethane polymer in an aqueous solution containing at least one of urea formaldehyde, melamine formaldehyde, or polyurethane and heating and stirring the aqueous solution to polymerize the at least one of urea formaldehyde, melamine formaldehyde, or polyurethane and encapsulate the monomer of polyurethane polymer within the at least one of urea formaldehyde, melamine formaldehyde, or polyurethane.

20. The method of claim 17, wherein forming the first thermoplastic polymeric layer including the first healing agent over the first side of the fabric layer comprises:

forming a vascular network over the first side of the fabric layer;

filling, at least partially, the vascular network with the first healing agent; and applying a thermoplastic polymeric material including a catalyst over the vascular network.

\* \* \* \* \*